UNITED STATES PATENT OFFICE.

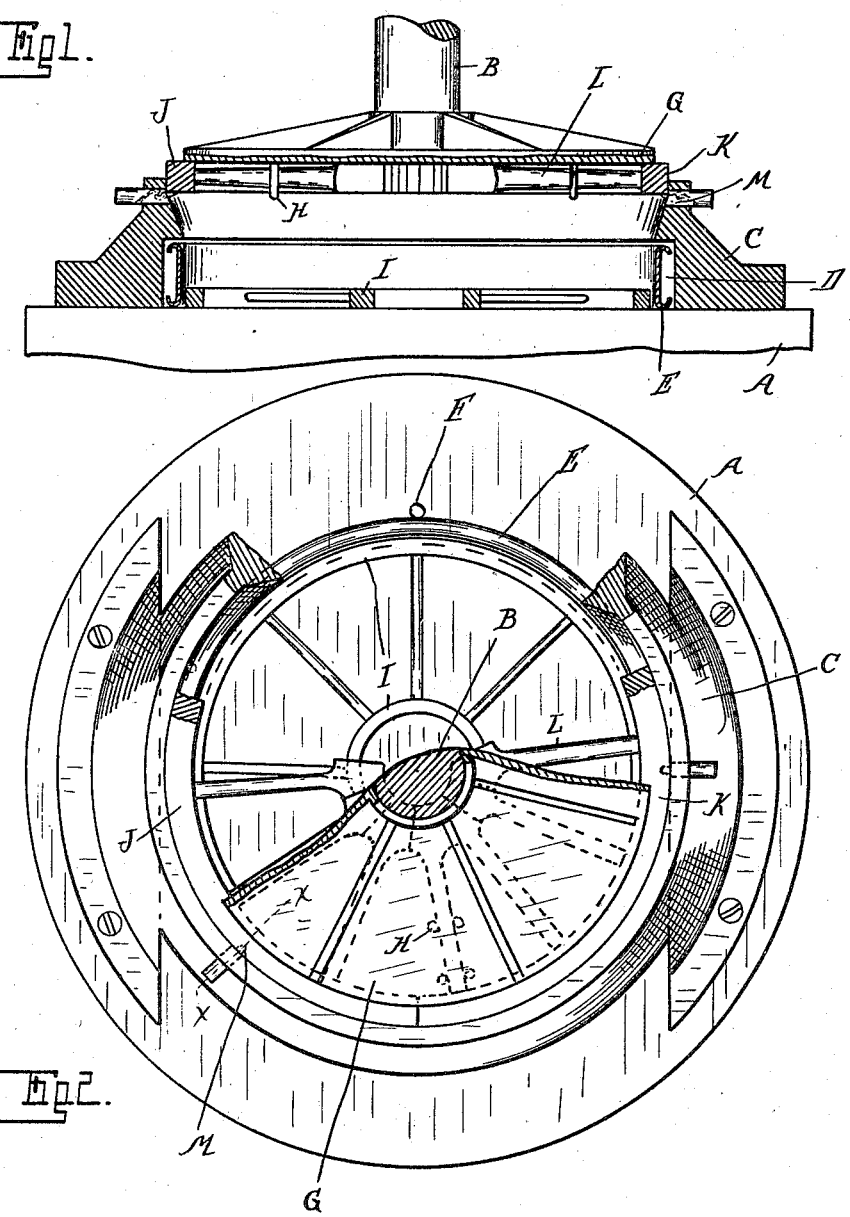

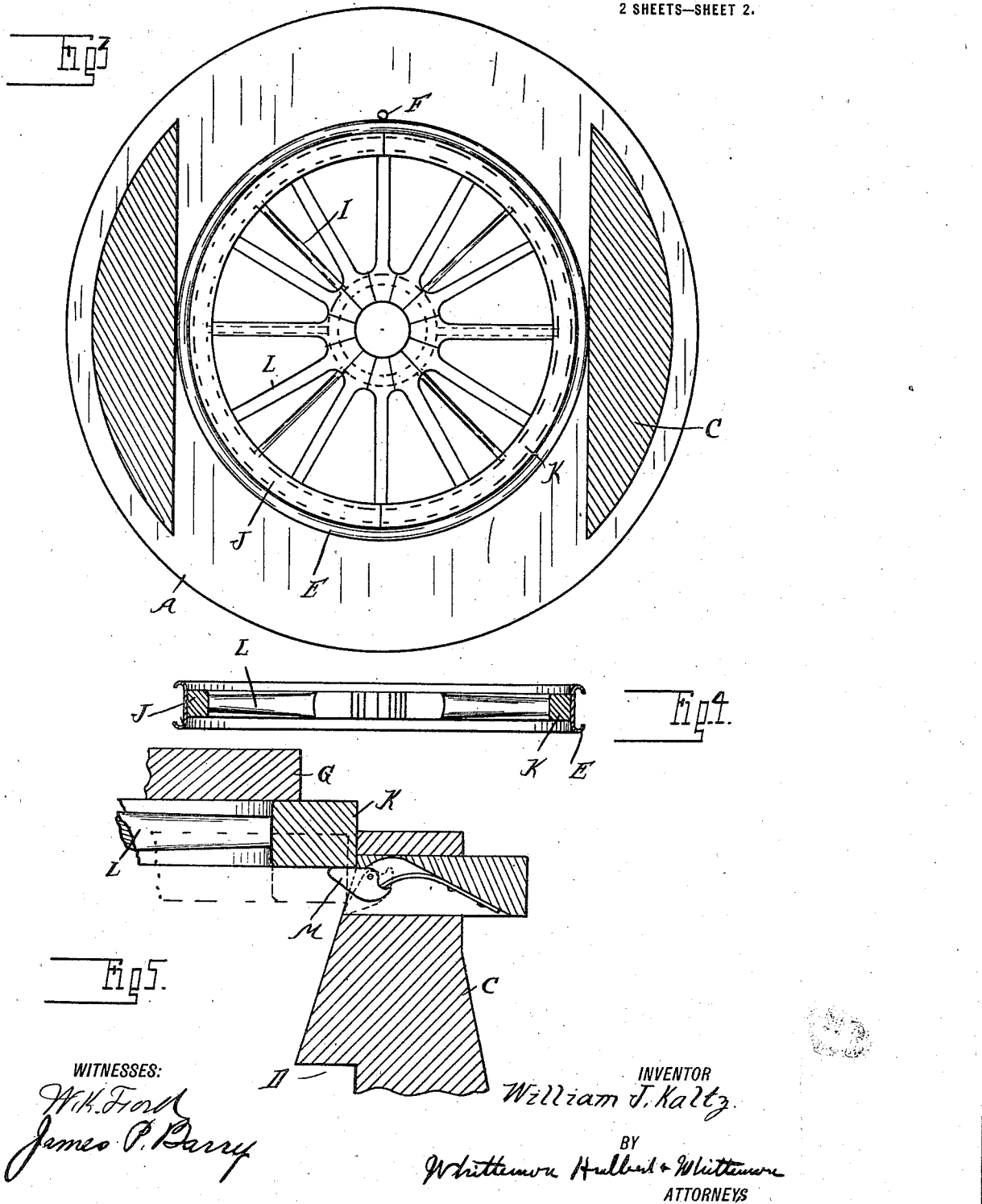

WILLIAM J. KALTZ, OF WINDSOR, ONTARIO, CANADA, ASSIGNOR TO KELSEY WHEEL COMPANY, OF DETROIT, MICHIGAN, A CORPORATION OF MICHIGAN.

MACHINE FOR ASSEMBLING SPOKED WHEELS.

1,189,828.   Specification of Letters Patent.   Patented July 4, 1916.

Application filed October 26, 1914. Serial No. 868,686.

*To all whom it may concern:*

Be it known that I, WILLIAM J. KALTZ, a citizen of the United States of America, residing at Windsor, in the Province of Ontario and Dominion of Canada, have invented certain new and useful Improvements in Machines for Assembling Spoked Wheels, of which the following is a specification, reference being had therein to the accompanying drawings.

The invention relates to the manufacture of spoked wheels and particularly for wheels designed for use upon motor vehicles, and the invention comprises the novel construction of machine by means of which the spoked felly sections may be directly pressed into the metallic wheel rim.

The process which is carried out by said machine is made the subject-matter of my co-pending application, Serial Number 868,685, filed October 26, 1914.

In the drawings: Figure 1 is a vertical central section through the machine; Fig. 2 is a plan view partly in section; Fig. 3 is a horizontal section in the plane of the wheel rim; Fig. 4 is a cross section through the completed wheel; and Fig. 5 is a cross section on line x—x Fig. 2.

A is the bed of a press, B is the press plunger, and C is an annular member mounted upon the bed B having a conical inner face, the lower end of which is of a diameter substantially the same as that of the wheel rim, while the upper end is of sufficient diameter to receive the uncompressed wheel felly sections. The member C is also cut away in its lower portion at D to provide for the insertion of a wheel rim E beneath the tapering portion of the member C. Preferably the member C is so cut away that the rim may be inserted from one side and withdrawn from the other side, a removable stop F serving to properly aline the rim beneath the tapering portion.

G is a follower on the plunger B of a diameter which will pass through the contracted end of the conical member C. H are guide pins depending from said follower and adapted to engage with and properly position one of the spokes of the wheel. I is a stop upon the bed A and serving to limit the downward movement of the plunger.

With the construction as described in the operation of assembling a wheel, complementary felly sections J K having spokes L in engagement therewith are placed beneath the follower F into engagement with the upper portion of the conical member C. To temporarily hold these members in such position suitable means is provided, such as the yieldable dogs M engaging recesses in the member C. When the sections J and K are thus placed in engagement one of the spokes L of each section is also engaged with the guides H, so as to position the same in proper radial alinement. The plunger B is then depressed, which causes the follower F to bear upon the felly sections forcing them downward through the tapering guide, which simultaneously contracts said sections circumferentially until the diameter is reduced sufficiently to pass into engagement with the rim E. This rim is heated prior to its registration with the member C so as to be slightly expanded and subsequently the contraction of the metal will place a permanent stress upon the felly sections.

A machine such as described will assemble the spoked felly sections with the rim in a single operation, whereas with the methods heretofore employed several operations are necessary.

What I claim as my invention is:—

1. A machine for assembling spoked wheels comprising a bed, an annular member mounted on said bed having a tapering conical portion and cut away beneath said conical portion for the lateral insertion of a wheel rim, a depressible plunger, and means on said plunger bearing upon complementary spoked felly sections while in engagement with said guide to force the same into said rim.

2. A machine for assembling spoked wheels comprising a bed, an annular member mounted on said bed, cut away in its lower portion for the lateral insertion of a wheel rim and having a tapering conical portion for registration with said rim, a depressible plunger, a follower on said plunger for engaging complementary spoked felly sections and forcing the same through said tapering guide into said rim, and means for guiding one of the spokes during said movement to hold the same in radial relation.

3. A machine for assembling spoked wheels, comprising a bed, an annular member mounted on said bed, cut away on diametrically opposite sides respectively for the insertion and withdrawal of a wheel rim, said member being provided with a tapering conical portion for registering with said rim, a depressible plunger, a follower on said plunger for engaging complementary spoked felly sections and forcing the same through said tapering conical portion into engagement with the rim, and depending pins upon said follower for engaging one of the spokes to hold the same radial.

4. A machine for assembling spoked wheels, comprising a bed, an annular member mounted on said bed, cut away on diametrically opposite sides respectively for the insertion and withdrawal of a wheel rim, said member being provided with a tapering conical portion for registering with said rim, a depressible plunger, and a follower on said plunger for engaging complementary spoked felly sections and forcing the same through said tapering conical portion into said rim.

5. A machine for assembling spoked wheels, comprising a bed, a depressible plunger, a tapering guide above said bed for receiving complementary spoked felly sections, a follower on said plunger for engaging said felly sections and forcing the same through said guide, and means for temporarily holding the felly sections in initial position adjacent the inlet end of the tapering member.

6. A machine for assembling spoked wheels, comprising a bed, a depressible plunger, a tapering guide above said bed for receiving complementary spoked felly sections, a follower on said plunger for engaging said felly sections and forcing the same through said guide, and means carried by the annular member for yieldably supporting the felly sections in initial position at the inlet of the tapering member.

7. A machine for assembling spoked wheels, comprising a bed, a depressible plunger, a tapering guide above said bed for receiving complementary spoked felly sections, a follower on said plunger for engaging said felly sections and forcing the same through said guide, and a plurality of dogs pivoted in recesses in the tapering member adjacent its inlet, normally projecting into said inlet to temporarily support the felly sections and yieldable into said recesses when the felly sections are forced downwardly.

8. A machine for assembling spoked wheels, comprising a bed, a tapering guide above said bed for receiving complementary spoked felly sections, a plunger, a follower on said plunger for engaging said sections and forcing the same through said guide, and a stop upon the bed having portions for engaging the spokes and felly sections.

In testimony whereof I affix my signature in presence of two witnesses.

WILLIAM J. KALTZ.

Witnesses:
JAMES P. BARRY,
HENRI E. BOWMAN.